(12) United States Patent
Tseretopoulos et al.

(10) Patent No.: US 11,373,229 B2
(45) Date of Patent: Jun. 28, 2022

(54) CONTEXTUALLY-AWARE RECOMMENDATION AND TRANSLATION ENGINE

(71) Applicant: The Toronto-Dominion Bank, Toronto (CA)

(72) Inventors: Dean Tseretopoulos, Toronto (CA); Gregory R. Harper, Milton (CA); Sarabjit S. Walia, Demarest, NJ (US); John Jong-Suk Lee, Toronto (CA); Michael W. Van Eesbeek, Markham (CA); Arun Victor Jagga, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 783 days.

(21) Appl. No.: 15/649,355

(22) Filed: Jul. 13, 2017

(65) Prior Publication Data
US 2019/0019234 A1    Jan. 17, 2019

(51) Int. Cl.
*G06Q 30/00* (2012.01)
*G06Q 30/06* (2012.01)
(Continued)

(52) U.S. Cl.
CPC ..... *G06Q 30/0631* (2013.01); *G06F 16/9035* (2019.01); *G06F 16/951* (2019.01);
(Continued)

(58) Field of Classification Search
CPC ............. G06Q 30/0631; G06Q 20/322; G06Q 30/0601; G06Q 20/3224; G06F 16/951; G06F 16/9035; G06F 40/30; G06F 40/58
(Continued)

(56) References Cited

U.S. PATENT DOCUMENTS 7,720,844 B2    5/2010   Chu et al.
8,694,456 B2    4/2014   Grigg et al.
(Continued)

OTHER PUBLICATIONS

Bao et al., "Location-based and preference-aware recommendation using sparse geo-social networking data," Nov. 6-9, 2012, 10 pages.
(Continued)

*Primary Examiner* — Anand Loharikar
(74) *Attorney, Agent, or Firm* — Fish & Richardson P.C.

(57) ABSTRACT

The present disclosure involves systems, software, and computer implemented methods for presenting recommendations for suggested activities. One example method includes receiving a first signal from a device that includes a current context of the device that includes location information for the device. The device is associated with a particular profile. A preferred language associated with the device is determined from the profile. The profile is analyzed to determine a contextual activity preference associated with the device. A repository of establishment information is searched to identify an activity that matches the current context associated with the device and the contextual activity preference. An activity description of the identified activity is translated from a foreign language to the preferred language to create a translated activity description. A second signal is transmitted to the device that includes the translated activity description for presentation at the device.

6 Claims, 7 Drawing Sheets

(51) Int. Cl.
   *G06Q 20/32* (2012.01)
   *G06F 16/951* (2019.01)
   *G06F 16/9035* (2019.01)
   *G06F 40/30* (2020.01)
   *G06F 40/58* (2020.01)

(52) U.S. Cl.
   CPC .............. *G06F 40/30* (2020.01); *G06F 40/58* (2020.01); *G06Q 20/322* (2013.01); *G06Q 20/3224* (2013.01); *G06Q 30/0601* (2013.01)

(58) Field of Classification Search
   USPC ................................................ 705/26.1–27.2
   See application file for complete search history.

(56) References Cited

U.S. PATENT DOCUMENTS

| | | |
|---|---|---|
| 9,179,250 B2 | 11/2015 | Eustice et al. |
| 9,200,918 B2 | 12/2015 | Chelotti et al. |
| 9,400,186 B1 | 7/2016 | Bank et al. |
| 9,471,599 B2 | 10/2016 | Varoglu et al. |
| 2009/0281875 A1 | 11/2009 | Tarka |
| 2010/0228577 A1 | 9/2010 | Cunningham et al. |
| 2011/0184945 A1 | 7/2011 | Das et al. |
| 2011/0208617 A1 | 8/2011 | Weiland |
| 2013/0041696 A1 | 2/2013 | Richard |
| 2013/0046625 A1 | 2/2013 | Grigg et al. |
| 2013/0046631 A1 | 2/2013 | Grigg et al. |
| 2013/0046633 A1 | 2/2013 | Grigg et al. |
| 2013/0085861 A1 | 4/2013 | Dunlap |
| 2013/0191195 A1 | 7/2013 | Carlson et al. |
| 2013/0345958 A1 | 12/2013 | Paek et al. |
| 2014/0129132 A1 | 5/2014 | Yoshizu |
| 2014/0142992 A1 | 5/2014 | Nuzzi et al. |
| 2014/0229335 A1 | 8/2014 | Chen |
| 2015/0012467 A1 | 1/2015 | Greystoke et al. |
| 2015/0073841 A1 | 3/2015 | Gray et al. |
| 2015/0269150 A1 | 9/2015 | Carper et al. |
| 2015/0269152 A1 | 9/2015 | Rekhi et al. |
| 2015/0370903 A1 | 12/2015 | Schuller |
| 2016/0173631 A1 | 6/2016 | McKay et al. |
| 2016/0283992 A1 | 9/2016 | Zamer |
| 2016/0353235 A1 | 12/2016 | Williams et al. |
| 2016/0379257 A1 | 12/2016 | Shekar et al. |
| 2017/0048664 A1 | 2/2017 | Zhang et al. |

OTHER PUBLICATIONS

Gupta et al., "Location Based Personalized Restaurant Recommendation System for Mobile Environments," Aug. 2013, 5 pages.

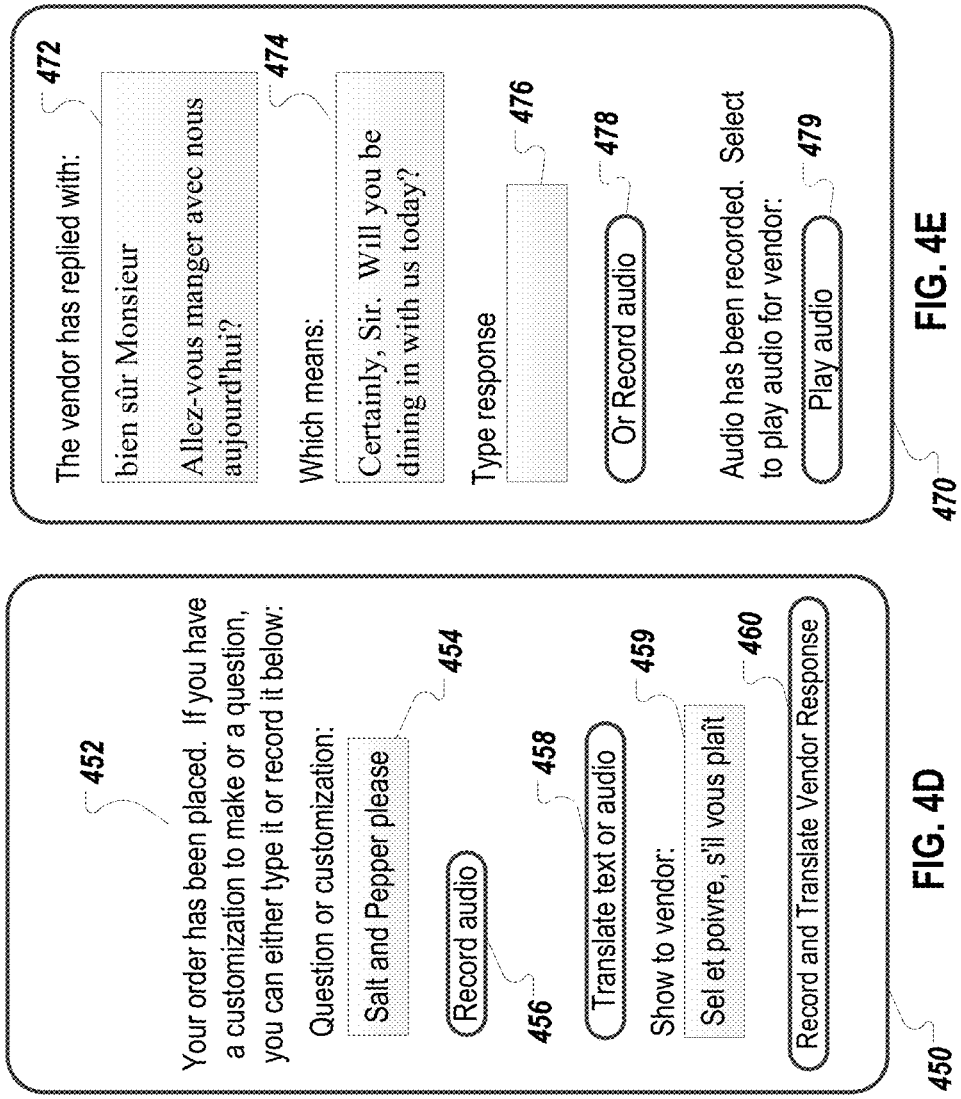

CONTEXTUALLY-AWARE RECOMMENDATION AND TRANSLATION ENGINE

TECHNICAL FIELD

The present disclosure relates to computer-implemented methods, software, and systems for presenting recommendations for suggested activities.

BACKGROUND

Location-based services can be used to enhance mobile applications. For example, information presented by an application or processing performed by an application can be based on or influenced by the location of a mobile device. As a specific example, advertising presented in an application can be based on a mobile device's location. For example, an advertisement for an establishment can be presented in an application in response to a detection that the mobile device is within a threshold radius of the establishment.

SUMMARY

The present disclosure involves systems, software, and computer implemented methods for presenting recommendations for suggested activities. One example system includes a communications module, at least one memory storing instructions, a plurality of profiles, a repository of establishment information including descriptions of activities that are available to be performed at a plurality of geographic locations, and at least one hardware processor interoperably coupled with the at least one memory. The instructions instruct the at least one hardware processor to: receive a first signal via the communications module from a device, the first signal including a current context associated with the device including at least location information for a geographic location of the device, the device associated with a particular profile in the plurality of profiles; determine, from the particular profile, a preferred language associated with the device; analyze the particular profile to determine at least one contextual activity preference that matches the current context associated with the device; in response to receiving the first signal, search the repository of establishment information based on the location information, the current context associated with the device, and the at least one determined contextual activity preference to identify at least one activity in response to the search, the at least one identified activity matching the current context associated with the device and the at least one determined contextual preference, the at least one identified activity associated with at least one activity description in a foreign language different than the preferred language associated with the device; translate the at least one activity description of the at least one identified activity from the foreign language to the preferred language to create at least one translated activity description; and transmit, via the communications module, a second signal to the device, the second signal including the at least one translated activity description for presentation at the device.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIGS. 4D and 4E are example conversational user interfaces.

DETAILED DESCRIPTION

Figure 1:
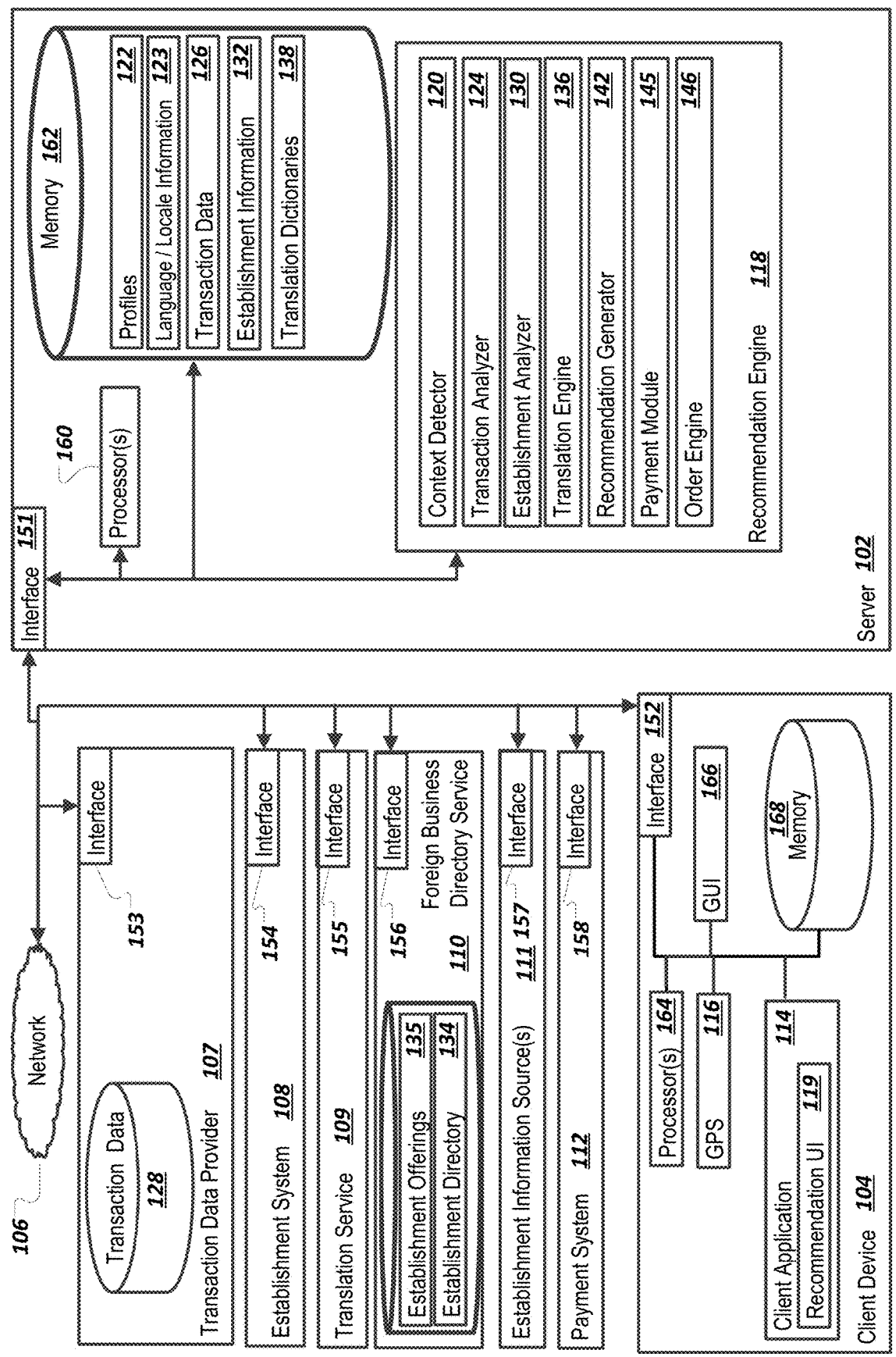
FIG. 1 is a block diagram illustrating an example system for presenting recommendations for suggested activities.

Users of applications, such as a mobile apps related to financial or lifestyle tracking, can have routines of activities that they regularly perform that they find enjoyable. For example, a user may often make certain kinds of purchases at certain kinds of establishments, perform certain kinds of activities at certain kinds of venues, or perform a certain action, transaction, or activity in response to a particular event or at a certain time of day. The user may have found certain types of transactions and activities near to their regular places of work or residence or commute that they find enjoyable. Such activities can be referred to as "comforts of home." A user may like to purchase a certain type of coffee at a certain time of day, for example.

The user may not know how to find such comforts of home while traveling in a foreign location or another location away from their normal areas of activities. For example, a brand of vendor of the type of goods that the user frequents may not be available at and/or located in the foreign location. As another example, the user may not know which other vendors offer similar offerings. The user may not speak the foreign language, for example, and may not easily be able to find suitable vendors. If a vendor is found, the user may have difficulty communicating with the vendor due to not knowing the foreign language.

To solve these issues for the user and to provide the user familiar comforts of home while traveling, the system described herein can provide a recommendation engine that can identify vendors who offer products or activities similar to those the user is accustomed to enjoying (e.g., in type and quality). For example, after the user arrives in a foreign country, the system can detect the location and identify that a local language is different from the user's preferred language. The system can also detect, based on analyzed transaction data associated with the user and associated with a user profile, that the user has a preference of having a particular type of coffee at a particular time of day (e.g., late morning). The system can automatically recognize that the particular time of day is approaching without user input and can generate and provide for presentation a recommendation for the user for where the user may be able to purchase the type of coffee that the user enjoys, such as through a push notification on a mobile device (e.g., via a mobile app), a text or multimedia message (e.g., SMS or MMS), or any other suitable indication or presentation.

The system can search for nearby establishments that are similar to coffee shops the user usually orders from (e.g., in price and quality), select a particular coffee shop that matches the search, and generate and provide for presentation a recommendation for the user to visit the coffee shop. The user can accept the recommendation and view information about the coffee shop, such as location, directions, hours of operation, etc. Based on additional location-based information from a device of the user, the system can detect that the user has arrived at the coffee shop and present a menu of items that are available at the coffee shop. The coffee shop offerings can be translated from local menu information (e.g., as found on a website of the coffee shop) in the local language to the preferred language of the user. The user can select an item to order, and the system can assist in placing the order, such as by presenting a local language version of a description of the item or by generating and providing an audio description of the user-selected order in the local language. In general, the system can assist the user with all facets of the transaction of ordering from a local vendor in the non-preferred language. For example, the system can assist with other translation tasks (e.g., modifying an order), payment (e.g., advice on manual payment or performing automatic electronic payment), tipping, directions, or obtaining vendor information (reviews, item descriptions), among others.

By providing recommendations and assisting the user with foreign establishment transactions, the system can improve relationships between the system and users and increase a positive association that users may have with the system or a brand associated with or providing the system. Users are able to enjoy comforts of home while traveling, even when traveling in unfamiliar locations with unfamiliar languages.

FIG. 1 is a block diagram illustrating an example system 100 for presenting recommendations for suggested activities. Specifically, the illustrated system 100 includes or is communicably coupled with a server 102, a client device 104, a network 106, a transaction data provider 107, an establishment system 108, a translation service 109, a foreign business directory service 110, establishment information sources 111, and a payment system 112. Although shown separately, in some implementations, functionality of two or more systems or servers may be provided by a single system or server. In some implementations, the functionality of one illustrated system or server may be provided by multiple systems or servers. Any combination or permutation of systems may perform the functionality described herein.

A user of the client device 104 may want comforts of home while traveling, but may not know which foreign vendors provide products or services to which the user is accustomed. The user may, while in a foreign location, use a client application 114 to send a recommendation request to the server 102. In some instances, user-modifiable or default settings of the client application 114 may be such that the client application 114 may run in the background of the client device 104 without user interactions or specific recommendation requests. The recommendation request can include location information for the client device 104, such as location information provided by a GPS receiver 116 included in the client device 104, IP address information, cellular or network information that may be used to determine location, or any other location. As another example, the client application 114 can be configured to automatically and periodically send a recommendation request that includes location information to a recommendation engine 118 included in or otherwise associated with the server 102. The recommendation engine 118 can automatically detect when a user is traveling based on the location information or other contextual user information (e.g., based on information from a calendar associated with the user, based on previously purchased travel plans or tickets, etc.), and in response to determining that the user is traveling and that a recommendation is prudent based on the user's history and/or specific request, automatically provide one or more recommendations for display in the client application 114, in a recommendation UI (User Interface) 119. The recommendation engine 118 can be or include one or more of a user-based collaborative filtering engine, a content-based recommendation engine, a matrix factorization engine, or an item-based collaborative filtering engine.

For example, a context detector 120 included in the recommendation engine 118 can automatically determine that the received location information corresponds to a foreign location for the user (e.g., relative to their normal or known locations and/or relative to the user's preferred language as compared to local language(s) corresponding to the received location information). The context detector 120 can identify or determine a preferred language of the user, such as by retrieving preferred language information associated with a profile associated with the user and/or the client device 104 stored in one of a plurality of profiles 122 at or associated with server 102. The context detector 120 can determine one or more local languages and/or dialects at the user's current location based on the received location information for the client device 104 (such as from language/locale information 123), and can determine that the user's preferred language does not match the local language(s). Based on the non-match of languages, the context detector 120 can determine that the user is traveling in a foreign location in which they may not know or be comfortable speaking or interacting with the language.

In some implementations, the context detector 120 determines a distance between received location information for the client device 104 and previously received location information for the client device 104 or from a home or standard location associated with the user. The context detector 120 may perform a language difference check in response to determining that the distance is more than a threshold amount, for example. In some implementations, some travel detection processing is performed on the client device 104. For example, the client application 114 can be configured to detect a change in a location of the client device 104 that is more than a threshold different than a user's home location or a previously known location associated with the client device 104. If a current location of the client device 104 is more than a threshold different than a previously known location of the client device 104, the client application 114 can be configured to send a recommendation request to the server 102.

The context detector 120 can determine other context associated with a recommendation request. For example, the context detector 120 can determine a time of day, a time of year, a season, a day of week, a time of month, etc., associated with a time of the recommendation request. In some instances, the context detector 120 can determine a local time and season for the current location of the user and client device 104.

In response to determining that the user is traveling in or is currently at a location that has a local language different from the user's preferred language, the recommendation engine 118 can analyze the profile 122 that is associated with the client device 104 and/or the user of the client device 104 to determine one or more contextual activity preferences that are associated with the profile 122. A contextual activity preference can indicate an activity (e.g., purchase, use of a service, going to a particular type of facility, or performing some other type of activity) that a user frequently performs in a context that matches a context associated with the recommendation request. For example, the recommendation engine 118 can determine, based on the profile 122 (e.g., via analysis and evaluation of transactional data associated with the user or client device 104 corresponding to the profile 122) that a user frequently makes purchases from high-end coffee shops during late mornings.

The contextual activity preferences can be determined by a transaction analyzer 124, prior to and/or in response to a recommendation request. The transaction analyzer 124 can analyze transaction data 126 associated with a user who is associated with the client device 104. The transaction data 126 can be a copy of transaction data 128 provided by the transaction data provider 107, for example. The transaction data 126 can include purchase information, location information, check-in information, sentiment information, reviews about merchants, venues, activities, etc. The transaction analyzer 124 can analyze the transaction data 126 to determine activity patterns that indicate one or more contextual activity preferences associated with a profile with which the client device 104 is associated. For example, the transaction analyzer 124 can determine that a user often plays golf on Saturday mornings, or often checks in during late afternoons to health clubs that include swimming pools.

The transaction analyzer 124 can determine, from the transaction data 126, types and relative classes (e.g., high-end, low-end, luxury, bargain, gender preference, smoking/non-smoking preference, over eighteen, children allowed) of vendors, merchants, or establishments that the user frequents, for different categories of offerings. For example, the transaction analyzer 124 can determine that the user frequents high-end gyms but often orders bargain breakfasts. The transaction analyzer 124 can look up merchants in a domestic merchant directory, or use other sources, to classify merchants and associated transactions associated with the transaction data 126 for the client device 104. Vendors, merchant, and establishment ratings and classifications may be established by any appropriate means, including data associated with one or more external applications to the present solution (e.g., Yelp, Google Reviews, among others), data associated with user feedback provided within the present solution or in a related application, etc.), domestic merchant dictionaries, professional review data sources, etc.

The transaction data 126 can include data for domestic transactions performed while the user is in their home country and also foreign transactions performed while the user is in foreign countries, either on the current trip or on previous visits to the same or other locations. The contextual activity preferences can be for activities the user often performs at home and can also be for activities that the user has performed while traveling in general or while traveling in particular locations, such as those activities the user performs at home and has previously performed while in other foreign or non-standard locales. The context detector 120 can determine that the user is currently traveling in a location in which they have previously traveled, and the transaction analyzer 124 can determine contextual activity preferences that are specific to the user's current location, in addition to or instead of contextual activity preferences that indicate common activities the user performs while at home or on other trips.

The transaction analyzer 124 can identify transactions that may indicate that the user is currently traveling or may travel at a future date. For example, the transaction data 126 may indicate a prior purchase of an airline ticket. In response to detecting the airline ticket purchase, information can be stored in the profile 122 associated with the client device 104 and its user to indicate a future likelihood of travel for the user. The context detector 120 can use the indication of a future likelihood of travel when determining whether the user is currently traveling.

An establishment analyzer 130 of the recommendation engine 118 can analyze establishment information 132 to determine establishments in the current location of the client device 104 that may offer activities (e.g., product purchases, services, other activities) that match the determined contextual activity preferences. The establishment analyzer 130 can determine that a merchant that the user normally visits (e.g., a particular brand of store) is not available at the location of the client device 104, and can therefore try to identify other establishments that offer similar services. Establishments can include vendors, merchants, places of business, service providers, buildings, facilities, or other designated locations (e.g., a park, an attraction). The establishment information 132 can include information that indicates places where certain activities can be performed, places that offer particular services or products, certain type of merchants, certain type of venues, etc. The establishment information 132 can be data that is obtained from the foreign business directory service 110, from other users of the present system, or from any other suitable source. The foreign business directory service 110 can provide an establishment directory 134 and/or establishment offerings information 135, for example. As another example, the establishment information 132 can be information obtained from the establishment information sources 111, which can include, for example review websites, travel websites, discussion forums, blogs, social networking sites, etc.

Some or all of the establishment information 132 can be in the preferred language associated with profile 122 associated with the client device 104. The establishment analyzer 130 can determine establishments that are located within a certain proximity of the location of the client device 104 that offer or are likely to offer activities that match the determined contextual activity preferences. For example, if a contextual activity preference is that a user often orders an inexpensive breakfast, the establishment analyzer 130 can determine one or more establishments that are near the client device 104, that offer breakfast, and that have a cost rating that is lower than a threshold (e.g., "two dollar signs or lower" in a business cost rating directory).

Some or all of the establishment information 132 can be in foreign language(s) that are local to the location of respective establishments. A translation engine 136 can, using translation dictionaries 138 and/or the translation service 109, translate determined contextual activity descriptions from the preferred language of the user to a foreign language to generate translated activity descriptions. The establishment analyzer 130 can determine nearby establishments that offer or are likely to offer activities that match the translated activity descriptions.

A recommendation generator 142 can generate one or more suggested activity recommendations based on the determined contextual activity preferences and matching establishments determined by the establishment analyzer 130. For example, the recommendation generator 142 can generate a recommendation to purchase luxury coffee at a nearby coffee shop one half hour before a time that the user normally purchases luxury coffee.

The translation engine 136 can translate establishment information 132 that is in a foreign language to the user's preferred language, for inclusion in a generated recommendation that is to be provided to the client device 104. Generated recommendation(s) can be sent from the server 102 to the client device 104, for presentation in the client application 114 (e.g., using a GUI 166 of the client device 104 or the recommendation UI 119 of the client application 114).

The recommendation UI 119 can enable the user to select a given recommendation, such as to accept the recommendation. Different recommendations for an establishment can be presented in multiple levels, or layers. For example, a first recommendation can be to visit a luxury coffee shop. If the user accepts the first recommendation, an updated user interface can be displayed that presents recommended items (or perhaps a menu of available items) that can be ordered from the luxury coffee shop. Establishment offering information can be obtained, by the recommendation generator 142, from the establishment information 132, the establishment offerings 135 included in or provided by the foreign business directory service 110, the establishment information sources 111, or an establishment system 108 associated with the establishment. The translation engine 136 can translate establishment offering information into the preferred language if the establishment offering information is received in a local language. Pricing information for offered items can be converted, by a payment module 145, from a local currency to a preferred currency of the user, and item prices can be presented in a recommendation in the user's preferred currency. A user's preferred currency can be identified from the profile 122 or determined based on the normal locations associated with the profile 122.

The recommendation UI 119 can enable the user to view directions to an establishment associated with a selected recommendation. Directions or related information (e.g., parking tips or direction information found on an establishment website) can be translated by the translation engine 136 from a local language at the current location to the user's preferred language. The client application 114 can be configured to determine when a location of the client device 104 is substantially the same as the location of the establishment associated with the selected recommendation. Establishment offering information (e.g., a menu of available items or recommended items) can be presented in the recommendation UI 119 in response to a determination that the user device is located at the establishment.

The user can select, on the recommendation UI 119, an item that is available from the establishment. In response to the selection of an item, the client application 114 can assist the user and the establishment with the ordering of the item from the establishment. For example, the user (or an employee of the establishment) can select an option on the recommendation UI 119 to view a translated item description in the local language. The translation engine 136 can provide a mapping of preferred language item descriptions to local language items descriptions, to the client device 104, for example. As another example, the translation engine 136 can provide to the client device 104 an audio recording of the translated item description, and the user (or the employee at the particular establishment) can select an option presented on the recommendation UI 119 to play the recording of the translated item description.

In some implementations, the client application 114 can include a live translation feature, such as if the user and the employee would like to discuss the order (e.g., modifications to the order). For example, the user can select an option on the recommendation UI 119 to initiate a live translation. The recommendation UI 119 can enable the recording of the user's voice (e.g., the user may say "extra sugar please"). The client application 114 can send the recording to the server 102, for translation by the translation engine 136. The translation engine 136 can generate a translated audio recording (e.g., a foreign language version of "extra sugar please"). The translated audio recording can be sent to the client device 104, for playback on the client device 104, so that the employee can understand the user's request. Alternatively or in addition, live translations of textual communications can be performed via the client application 114 based on a back and forth of text-based input translated into the respective reader's language of choice. Although described as a client/server translation, in some implementations, translation is performed by a translation engine executing locally on the client device 104.

The client application 114 can be configured to assist the user with paying for the selected item. As mentioned, pricing for the item can be displayed in a user's preferred currency. Pricing information can also be displayed in a local currency. The payment module 145 can convert pricing information either from the user's preferred currency to the local currency or from the local currency to the user's preferred currency, depending on a currency type of obtained pricing information. In some instances, both the local and preferred currency amounts can be presented concurrently. The payment module 145 can determine a user's preferred payment type from the profile 122. The recommendation UI 119 can be configured to present advice as to whether the establishment accepts the user's preferred payment type. In some implementations, the recommendation generator 142 selects (or filters) recommendations based on whether an establishment accepts a user's preferred payment type. The recommendation generator 142 can include, in a generated recommendation, other payment advice, such as other accepted payment types or tipping suggestions and/or customs applicable to the locale of the establishment.

Some establishments can support online ordering. The client application 114 can be configured to send a request to the establishment system 108 to place an order for the selected item. In some implementations, an order engine 146 on the server 102 is configured to interface with the establishment system 108, and the client application 114 sends a request to the server 102 for placement of an order with the establishment system 108. In yet further embodiments the order engine 146 may interface with a third party order application to place the order.

In some implementations, a user's actions with the recommendation UI 119 may affect future recommendations. For example, information regarding whether a user views a recommendation, accepts a recommendation, or orders an item from an establishment can be provided to the recommendation generator 142. The recommendation generator 142 can store the received information in the profile 122, for example. Information about a user's past actions with presented recommendations can be used by the recommendation generator 142 when determining future recommendations, such as by increasing a likelihood of generating a recommendation similar to recommendations acted on favorably by the user and decreasing a likelihood of generating a recommendation similar to recommendations not acted on by the user.

Although the term "language" is used throughout this disclosure, different languages can include different dialects of a same underlying language. The context detector 120 can determine, for example, that a user's preferred language corresponds to a first dialect of a given language and that a second dialect of the given language is used in the location of the client device 104. The translation engine 136 can translate information, such as an item description, from the second dialect to the first dialect, or perform other translations to assist the user and/or the vendor with completing a transaction. For example, an American user may be traveling in South Africa, and the translation engine 136 may translate between American English and South African English, as needed. Translations performed for a user can change as a user moves within a country or region. For example, a Chinese traveler may receive translations between English and Chinese while visiting Toronto and between French and Chinese later in a same trip while in Quebec.

A local language or dialect may be specific to a country, a state, a city, an area of a city, or an establishment. For example, Chinese may be a predominant language of a Chinatown area of a city that otherwise predominantly uses another language. The translation engine 136 can translate between Chinese and the user's preferred language, as needed. As another example, the transaction analyzer 124 can determine that the user likes Lebanese food. The user may be traveling in Brazil, and the recommendation engine 118 may generate a recommendation for a Lebanese restaurant in Brazil. The recommendation generator 142 may determine, based on information obtained from the establishment directory 134, that the proprietors of the Lebanese restaurant speak Lebanese, and that menu information is available in Lebanese (rather than Portuguese). The translation engine 136 can translate information between Lebanese and the user's preferred language, as needed.

In some implementations, a determination is made that the user's preferred language is used by less than a predetermined percent of people in the location of the client device 104. The translation engine 136 can translate between the user's preferred language and one or more other languages that are more predominantly used in the location. For example, in a given location, 85% of the population may speak German, 10% French, and 5% English. The recommendation UI 119 can provide options to translate between English and German and/or between English and French, if the user's preferred language is English.

User profiles 122 can be updated over time with information indicating a user's selection (or lack of selection) of various recommendations, and interactions in the recommendation UI 119. User profile data for a user's past selections, lack of selections, and interactions can be used to tailor future recommendations. User profiles 122 can include information relating to a user's behavior (e.g., transactions, interactions) while traveling as well as a user's behavior (e.g., transactions) while at home.

Although the recommendation engine 118 is illustrated as including the context detector 120, the transaction analyzer 124, the establishment analyzer 130, the translation engine 136, the recommendation generator 142, the payment module 145, and the order engine 146, fewer or more components may be included, and the described functionality of one or more of these may be combined into another component or generally into the recommendation engine 118.

The client device 104 may be any computer or processing device such as, for example, a general-purpose personal computer (PC), Mac®, workstation, UNIX-based workstation, or any other suitable device. In other words, the present disclosure contemplates computers other than general purpose computers, as well as computers without conventional operating systems. Further, the client device 104 may be adapted to execute any operating system, including Linux, UNIX, Windows, Mac OS®, Java™, Android™, iOS or any other suitable operating system.

Interfaces 151, 152, 153, 154, 155, 156, 157, 158, and 159 are used by the server 102, the client device 104, the transaction data provider 107, the establishment system 108, the translation service 109, the foreign business directory service 110, the establishment information sources 111, and the payment system 112, respectively, for communicating with other systems in a distributed environment—including within the system 100—connected to the network 106. Generally, the interfaces 151, 152, 153, 154, 155, 156, 157, 158, and 159 each comprise logic encoded in software and/or hardware in a suitable combination and operable to communicate with the network 106. More specifically, the interfaces 151, 152, 153, 154, 155, 156, 157, 158, and 159 may each comprise software supporting one or more communication protocols associated with communications such that the network 106 or interface's hardware is operable to communicate physical signals within and outside of the illustrated system 100.

The server 102 includes one or more processors 160. Each of the processors 160 may be a central processing unit (CPU), a blade, an application specific integrated circuit (ASIC), a field-programmable gate array (FPGA), or another suitable component. Generally, each of the processors 160 executes instructions and manipulates data to perform the operations of the server 102.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 102 includes memory 162. In some implementations, the server 102 includes multiple memories. The memory 162 may include any type of memory or database module and may take the form of volatile and/or non-volatile memory including, without limitation, magnetic media, optical media, random access memory (RAM), read-only memory (ROM), removable media, or any other suitable local or remote memory component. The memory 162 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the system 100.

The client device 104 may generally be any computing device operable to connect to or communicate within the system 100 via the network 106 using a wireline or wireless connection. In general, the client device 104 comprises an electronic computer device operable to receive, transmit, process, and store any appropriate data associated with the system 100 of FIG. 1. The client device 104 can include one or more client applications, including the client application 114. A client application is any type of application that allows the client device 104 to request and view content on the client device 104. In some implementations, a client application can use parameters, metadata, and other information received at launch to access a particular set of data from the system 100. In some instances, a client application may be an agent or client-side version of the one or more enterprise applications running on an enterprise server (not shown).

The client device 104 further includes one or more processors 164. Each processor 164 included in the client device 104 may be a central processing unit (CPU), an application specific integrated circuit (ASIC), a field-programmable gate array (FPGA), or another suitable component. Generally, each processor 164 included in the client device 104 executes instructions and manipulates data to perform the operations of the client device 104.

The client device 104 is generally intended to encompass any client computing device such as a laptop/notebook computer, wireless data port, smart phone, personal data assistant (PDA), tablet computing device, one or more processors within these devices, or any other suitable processing device. For example, the client device 104 may comprise a computer that includes an input device, such as a keypad, touch screen, or other device that can accept user information, and an output device that conveys information associated with the operation of the system 100, or the client device 104 itself, including digital data, visual information, or a graphical user interface (GUI) 166.

The GUI 166 of the client device 104 interfaces with at least a portion of the system 100 for any suitable purpose, including generating a visual representation of the client application 114, including the recommendation UI 119. In particular, the GUI 166 may be used to view and navigate various Web pages. Generally, the GUI 166 provides the user with an efficient and user-friendly presentation of business data provided by or communicated within the system. The GUI 166 may comprise a plurality of customizable frames or views having interactive fields, pull-down lists, and buttons operated by the user. The GUI 166 contemplates any suitable graphical user interface, such as a combination of a generic web browser, intelligent engine, and command line interface (CLI) that processes information and efficiently presents the results to the user visually.

Memory 168 included in the client device 104 may include any memory or database module and may take the form of volatile or non-volatile memory including, without limitation, magnetic media, optical media, random access memory (RAM), read-only memory (ROM), removable media, or any other suitable local or remote memory component. The memory 168 may store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 104.

There may be any number of client devices 104 associated with, or external to, the system 100. For example, while the illustrated system 100 includes one client device 104, alternative implementations of the system 100 may include multiple client devices 104 communicably coupled to the network 106, or any other number suitable to the purposes of the system 100. Additionally, there may also be one or more additional client devices 104 external to the illustrated portion of system 100 that are capable of interacting with the system 100 via the network 106. Further, the term "client", "client device" and "user" may be used interchangeably as appropriate without departing from the scope of this disclosure. Moreover, while the client device 104 is described in terms of being used by a single user, this disclosure contemplates that many users may use one computer, or that one user may use multiple computers.

Figure 2:
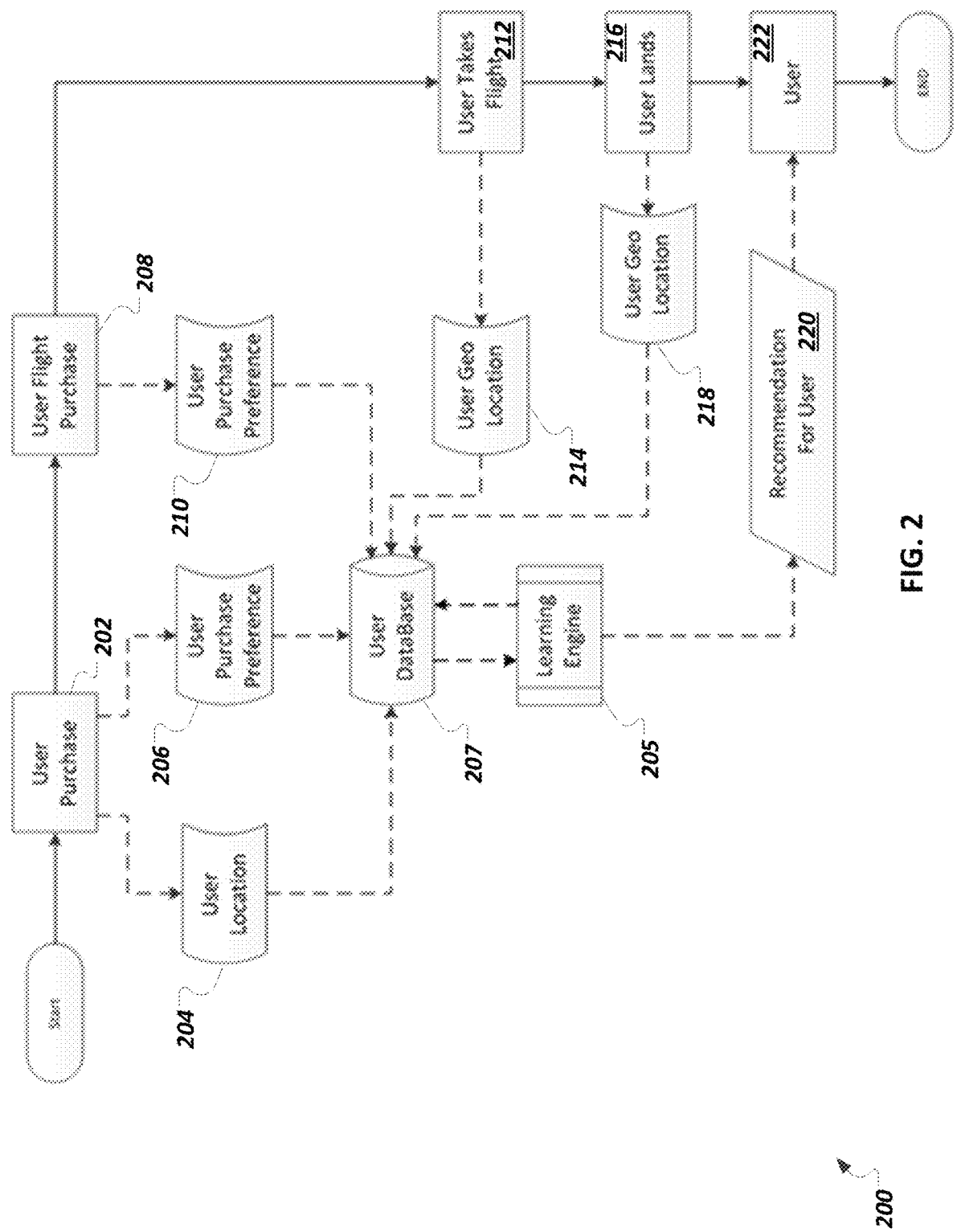
FIG. 2 is a flowchart of an example method for providing a recommendation for presentation on a user device.

FIG. 2 is a flowchart of an example method 200 for providing a recommendation for presentation on a user device. At 202, a user makes a purchase, where the purchase is associated with a user location 204. A learning engine 205 determines a user purchase preference 206 based on the purchase and stores the user preference 206 in a user database 207. The learning engine 205 can determine the user purchase preference 206 and other user purchase preferences based on the user purchase and other purchases made by the user. In some instances, the user purchase preference 206 is used to influence and update an existing set of preferences for use in further determinations and recommendations. At 208, the user makes a flight purchase. The learning engine 205 can determine a user purchase preference 210 based on the flight purchase (and possibly other purchases), or update existing preference information.

At 212, the user takes the flight associated with the flight purchase (or the time passes associated with the purchase ticket without cancellation or refund) traveling from a user's home geo location 214 and landing, at 216, at a foreign geo location 218. The learning engine 205 can, based on user purchase preferences stored in the user database 207 and on detecting the user's current location being the foreign geo location 218, determine one or more recommendations 220 for the user, such as for making a purchase similar to purchases for which data is stored in the user database 207 (e.g., in the context or timing corresponding to those normal purchases), at a foreign vendor located at the foreign geo location 218 who has been determined to offer a recommended product or service. At 222, the recommendation 220 is provided to the client device of the user for presentation.

Figure 3:
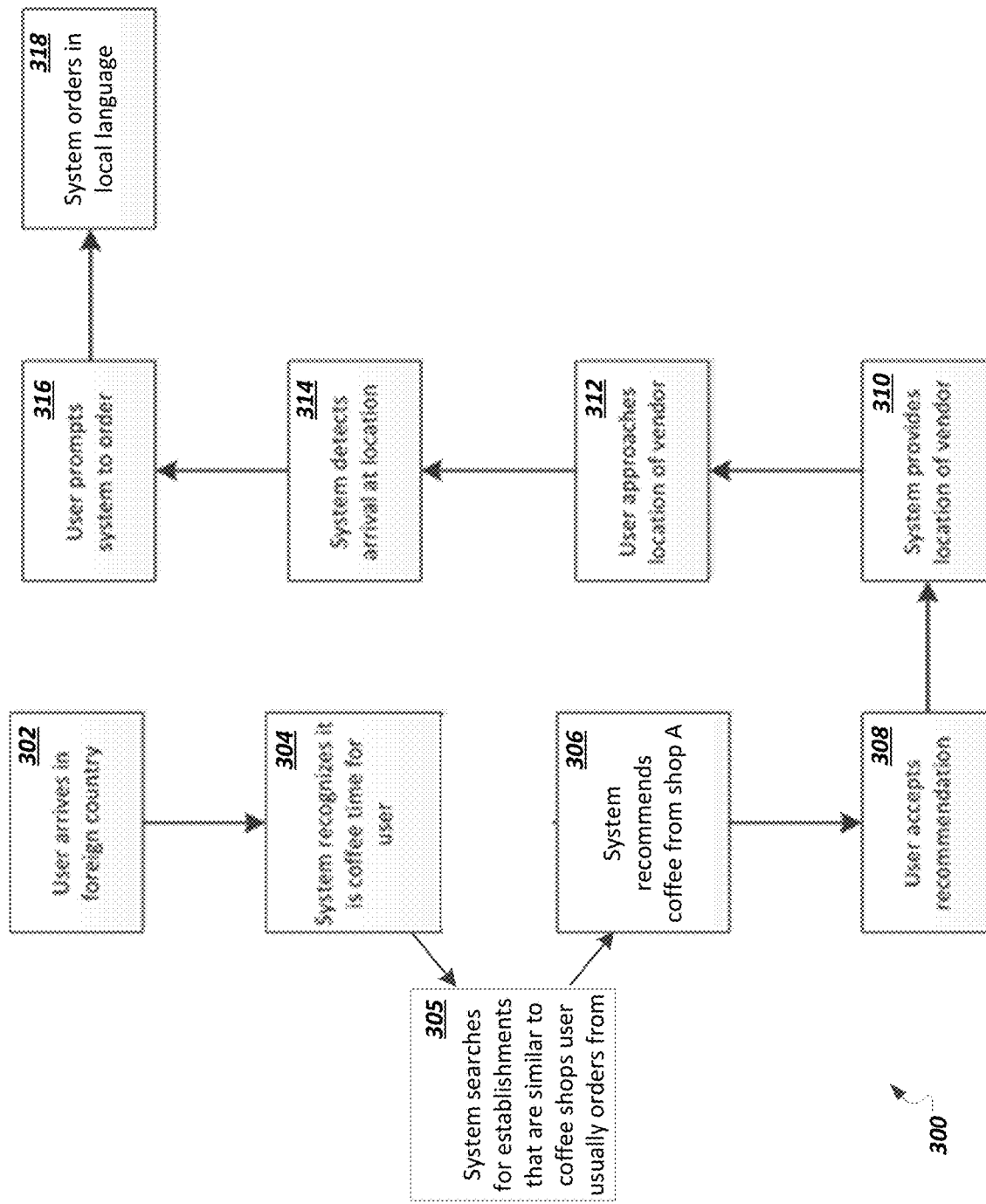
FIG. 3 is a flowchart of an example method for facilitating the ordering of a recommended product.

FIG. 3 is a flowchart of an example method 300 for facilitating the ordering of a recommended product. At 302, a user arrives in a foreign country. At 304, the system recognizes that the current time (or an upcoming time that is a predetermined or threshold amount of time (e.g., 30 minutes) or less from the current time) is a time that corresponds to a frequent activity of the user based on one or more prior transactions and/or determined or explicit user preferences (e.g., "coffee time", a time that the user often buys coffee at home and/or on other travels).

At 305, the system searches for coffee shops that are similar to coffee shops from which the user typically orders. The system can search a repository of establishment information, for example, for coffee shops that have characteristics (e.g., price, environment, offerings) that are similar to characteristics that have been identified for coffee shops that user often frequents. In some implementations, the repository of establishment information is in a local language that is different from the user's preferred language, and the system can translate the identified characteristics into the local language before searching. In some instances, coffee may not be a common product in a particular locale. In such instances, the system may identify a similar tea or other beverage location based on the stored preferences and a determination of the best match within the system.

At 306, the system recommends coffee from "coffee shop A." The system may have identified coffee shop A as being within a threshold distance of the user and as having characteristics that match or are sufficiently similar to coffee shops the user frequents. Coffee shop A may have a highest ranked matching score among other establishments, for example. If the repository of establishment information is in a language different from the user's preferred language, some information to be presented in a recommendation to the user can be translated to the user's preferred language before being presented. The recommendation can be presented on a mobile device of the user.

At 308, the user accepts the recommendation. For example, the user can select an accept user interface control on a user interface. At 310, the system provides the location of the vendor. For example, directions to the vendor can be presented on the mobile device. At 312, the user approaches the location of the vendor. At 314, the system detects the user's arrival at the location of the vendor. For example, an application on the mobile device (or on a server) can detect that the location of the mobile device is substantially the same as the location of the vendor.

At 316, the user prompts the system to order. A menu of items available from the vendor can be presented on the mobile device, for example. The system may obtain an electronic menu for the vendor in either the user's preferred language or in a language specific to the location of the vendor. If the electronic menu is not in the user's preferred language, the electronic menu can be translated to the user's preferred language before being presented. Pricing of menu items can be converted from a local currency to a preferred currency of the user, and item prices can be presented in the user's preferred currency. The user can select one or more presented items.

At 318, the system orders the selected item(s) in a local language. For example, the system can present a local language item description on the user interface, for presentation to the vendor. As another example, the system can play an audio file, in the local language, of the selected item description. As another example, the system can electronically order the selected item, by interfacing with an electronic system of the vendor.

In yet further embodiments, the system may engage in a conversation with a vendor employee to order the item on behalf of the user and in some instances may act as a translator between the two. In such embodiments the system may employ a conversational interface having built in natural language processing and natural language generation capabilities. Furthermore these capabilities may be refined based on aggregate data acquired from other instances of the application used on alternate user mobile devices.

In yet further embodiments of the system, during the step 318, the system may augment the conversational interface with textual data and a pictorial display that may be shown by the user to the vendor employee to facilitate the order. In addition, in instances where a user may have to wait for their order to be called the application may go into a listening mode where it listens for the order to be called and the informs the user when their order is ready.

In other implementations, the system can enable the user to place an order over the phone. For example, the system can translate foreign-language versions of vendor offering information to the user's local language and then play audio recording(s) of local-language versions of the vendor offerings, and enable the user to select one or more offered products or services. The system can then automatically place a call to the vendor and place an order over the phone with the vendor, playing an audio recording that includes a description of the ordered items in the language of the vendor.

The system can perform time-zone conversions as appropriate. For example, the system may know that a user from New York generally orders coffee at 8:00 am EST while at home. The system can determine to recommend the ordering of coffee at 8:00 am London time when the user is traveling in London. Other conversions can be performed, including conversions based on cultural considerations or a determination of a schedule change of a user. For example, the system may determine that a user generally orders coffee one hour after waking up (e.g., based on information obtained from a sleep monitoring application or a step-tracking application on the user's device, or other information). The user may wake up at a later time of day when traveling, due to a variety of reasons (e.g., jet lag, a general later workday start time common to the user's location, the user being on vacation, etc.). The system can determine a user's wake time and make a recommendation for coffee at a later time than a user's normal ordering, but still at a same time relative to their waking.

Figure 4C:
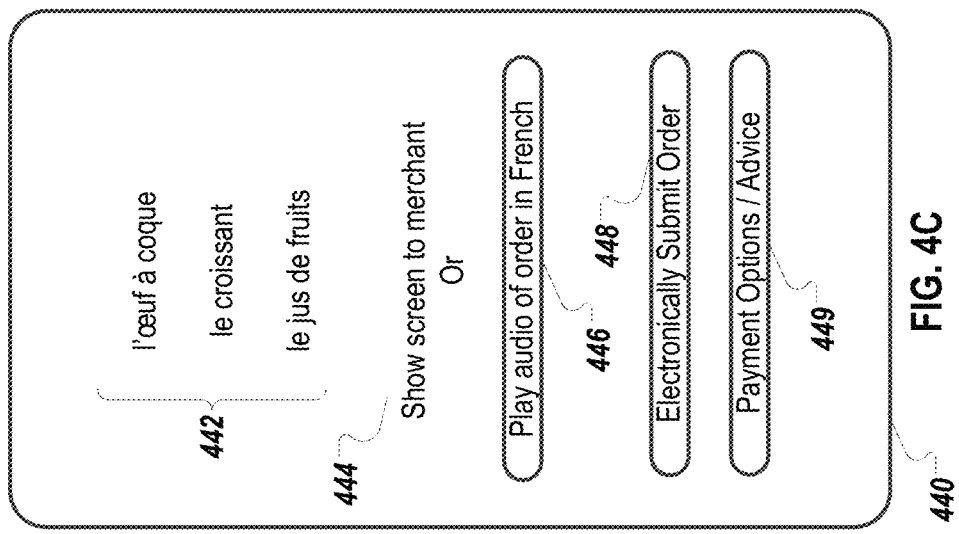
FIGS. 4A-4C are example user interfaces for presenting an activity recommendation.
Figure 4B:
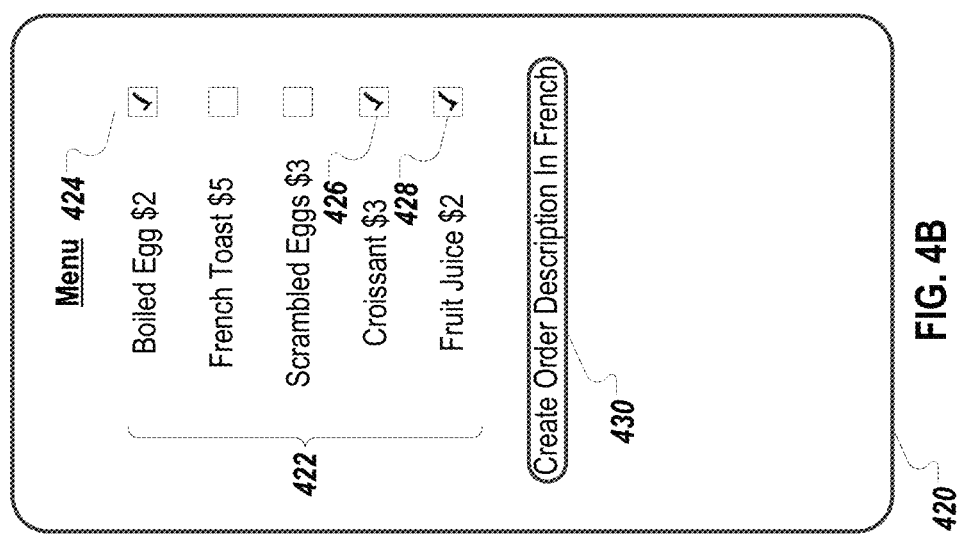
Figure 4A:
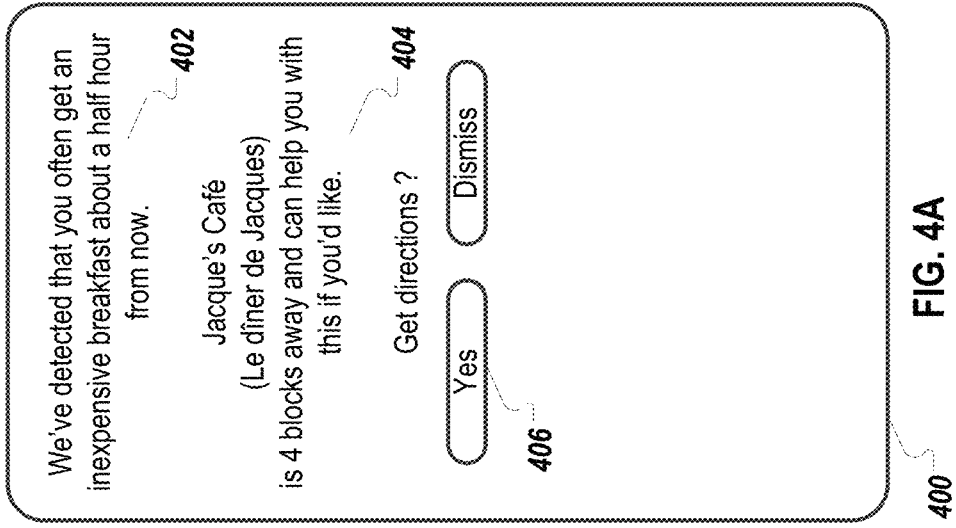

FIG. 4A is an example user interface 400 for presenting an activity recommendation. As indicated by a note 402, the system can detect, based on analysis of user transactions and/or information in a user profile, that the user often purchases an inexpensive breakfast around a same time (e.g., 8:00 am). In response to the detection, the note 402 can be displayed before (e.g., one half hour before) the time the user often purchases the breakfast. The system can identify the user's current location, and can search a directory of local establishments to identify nearby establishments that may offer a similar type of offering as the user's frequent inexpensive breakfast. The system can detect that certain establishments provide such an offering based on information in the directory and/or on other information, such as a website of the establishment, a review service, blogs, etc.

In response to detecting that a particular establishment offers the inexpensive breakfast and is within a threshold distance of the user's current location, a note 404 can be displayed that informs the user of the ability of the merchant to offer the inexpensive breakfast and a distance to the merchant. The note 404 includes the name of the merchant in the local language (e.g., French, "Le dîner de Jacques"), and a translated version of the merchant name in the preferred language of the user (e.g., English, "Jacques' Diner"). The user can select a control 406 to be presented directions to the merchant.

As shown in a user interface 420 in FIG. 4B, upon arriving at the merchant (or before), the user can be presented a menu 422 that lists items that are available to be ordered at the merchant. The menu 422 can be translated from the local language to the preferred language of the user. A local language menu can be obtained, for example, from a website of the merchant, an online menu service, or some other source. The user has selected items 424 (boiled egg), 426 (croissant), and 428 (fruit juice). The menu 422 includes prices for each listed item. Prices can be shown in a currency associated with the user. A currency conversion can be performed to convert a price in a local currency (such as included in the local language version of the menu) to the currency associated with the user, while factoring in current exchange rates, for example. The user can select a control 430 to create an order description in the local language, to be provided to the merchant so as to order the selected items in the local language.

As shown in a user interface 440 in FIG. 4C, an order description 442 includes local language descriptions of the items the user selected on the user interface 420. A note 444 instructs the user that they can show the user interface 440 (and the order description 442) to the merchant, so that the merchant can read the user's order in the language of the merchant. As another example, the user can select a control 446 to have the user device play an audio file that includes a playing of the order description in the language of the merchant.

For some merchants, the user can select a control 448 to submit an order electronically to a system of the merchant. The user can select a control 449 to otherwise get assistance or advice for making a payment to the merchant. For example, payment options that may be available, currency conversions, tip suggestions, etc., may be displayed in response to selection of the control 449.

FIGS. 4D and 4E are example conversational user interfaces 450 and 470, respectively. As shown in the conversational user interface 450, a message 452 is presented informing the user that their order has been placed and that they can provide a question or an order customization to the vendor. For example, the user can enter a question or customization request using an entry field 454. As another example, the user can select a record control 456 to record an audio recording of their question or customization. For example, the user has entered a customization request of "salt and pepper please" in the entry field 454. The user can select a translate control 458 to translate the customization request to the language used by the vendor. In response to the entry of the customization request into the entry field 454 and selection of the translate control 458, the system can translate the customization request and present a translated customization request in a translated request field 459. The translated request field 459 includes a French translation of "salt and pepper please," which can be shown to the vendor.

If the user selects the record control 456, the system can record an audio recording of the user's request and present a playback control (not shown). If the user selects the playback control, the system can translate the audio recording to the language of the vendor and play back the translated audio recording for the vendor. After the vendor has heard the translated audio recording (or has seen the translated customization request in the translated request field 459), the user can select a record and translate control 460 to cause the mobile device to record an audio recording of a spoken response of the vendor, and translate the audio recording to the language of the user.

For example and as shown in the conversational user interface 470, a vendor reply field 472 displays a vendor-language transcription of the recorded audio of the vendor response. The system can perform a speech to text conversion of the recorded audio of the vendor's response, for example. Alternatively or additionally, the system can present a playback control (not shown) for playing of a translated audio recording of the vendor response, in the language of the user. The system can translate the vendor-language transcription in the vendor reply field 472 to the user's language, and present a translated textual response in a translated response field 474. The translated response field 474 indicates that the vendor has responded with an answer of "Certainly, Sir. Will you be dining in with us today?". The user can enter a response in a response entry field 476 or can select a record control 478 to record a response audio recording. In response to selection of the record control 478, the system can record a spoken response from the user and present a control 479 for the user to select to cause translation of the recorded spoken response to the language of the vendor and playback of the translated spoken response for the vendor. If the user enters a response in the response entry field 474, the system can present a translate control (not shown) that the user can select to cause the mobile device to translate the response in the response entry field 474 to the language of the vendor and present a translated response on the conversational user interface 470, for presentation to the vendor. Other types of conversational user interfaces can be used. For example, the system can present the user with candidate translations of their inputs, and the user can select an appropriate translation. The system can use machine learning to improve translation and response interpretation for a specific user, over time.

Figure 5:
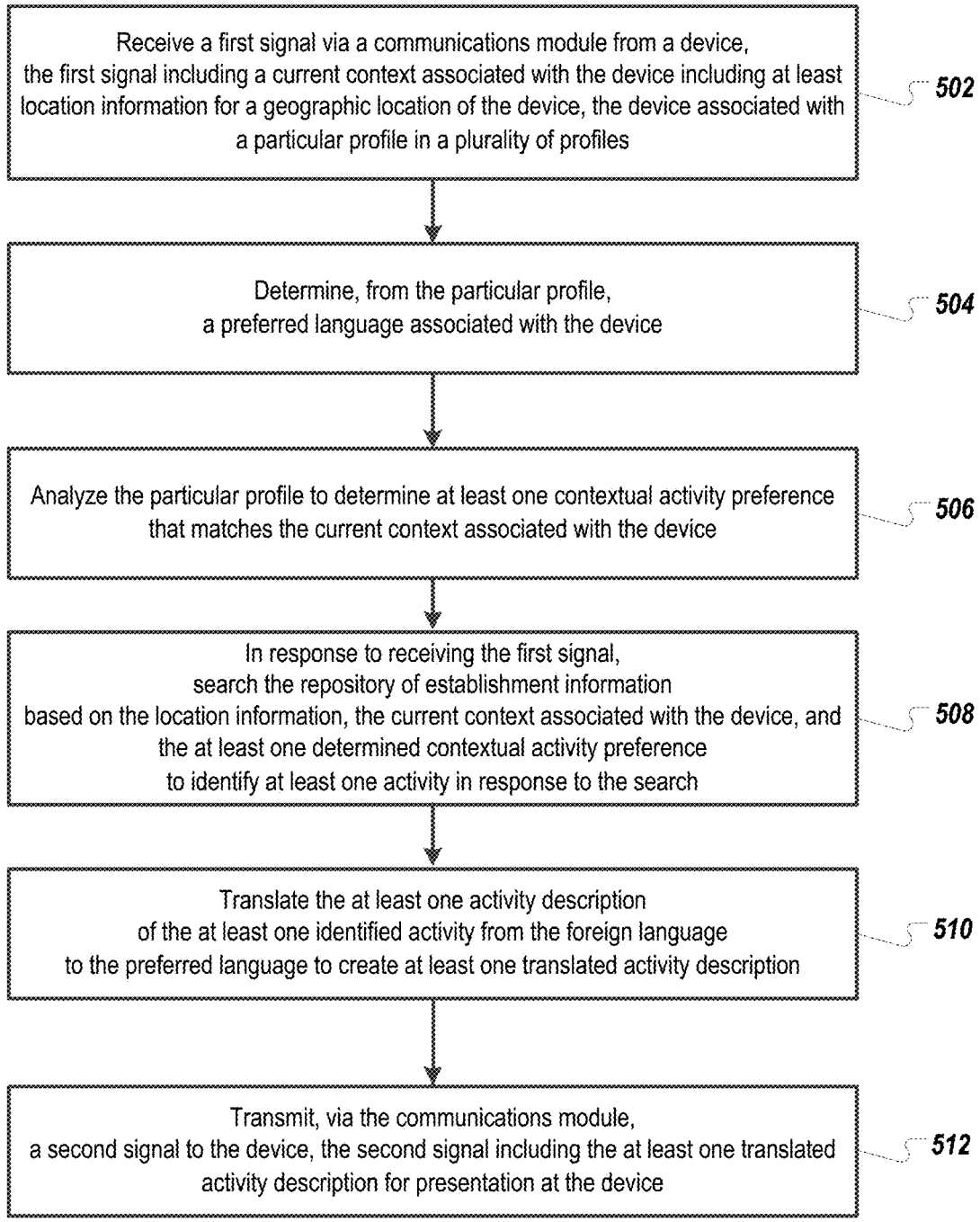
FIG. 5 is a flowchart of an example method for providing a recommendation for a suggested activity.

FIG. 5 is a flowchart of an example method 500 for providing a recommendation for a suggested activity. It will be understood that method 500 and related methods may be performed, for example, by any suitable system, environment, software, and hardware, or a combination of systems, environments, software, and hardware, as appropriate. For example, a server or other computing device can be used to execute method 500 and related methods and obtain any data from the memory of the server or the other computing device. In some implementations, the method 500 and related methods are executed by one or more components of the system 100 described above with respect to FIG. 1. For example, the method 500 and related methods can be executed by the recommendation engine 118 of FIG. 1.

At 502, a first signal is received, via a communications module and from a device. The first signal includes a current context associated with the device that includes at least location information for a geographic location of the device. The device is associated with a particular profile in a plurality of profiles. The profile may be specific to the device or to a user associated with the device.

At 504, a preferred language associated with the device is determined from the particular profile.

At 506, the particular profile is analyzed to determine at least one contextual activity preference that matches the current context associated with the device.

At 508, in response to receiving the first signal, a repository of establishment information is searched based on the location information, the current context associated with the device, and the at least one determined contextual activity preference to identify at least one activity in response to the search. The repository of establishment information includes descriptions of activities that are available to be performed at a plurality of geographic locations. The at least one identified activity matches the current context associated with the device and the at least one determined contextual preference and in some embodiments is compatible with a user profile. The user profile may be derived from the user's transaction history and compared to an aggregate of other users with regard to the at least one identified activity. The at least one identified activity is associated with at least one activity description in a foreign language different than the preferred language associated with the device. The repository of establishment information can include activity descriptions in a language local to geographic locations in which the establishments are located, for example.

At 510, the at least one activity description of the at least one identified activity is translated from the foreign language to the preferred language to create at least one translated activity description.

At 512, a second signal is transmitted, via the communications module, to the device. The second signal includes the at least one translated activity description for presentation at the device.

Figure 6:
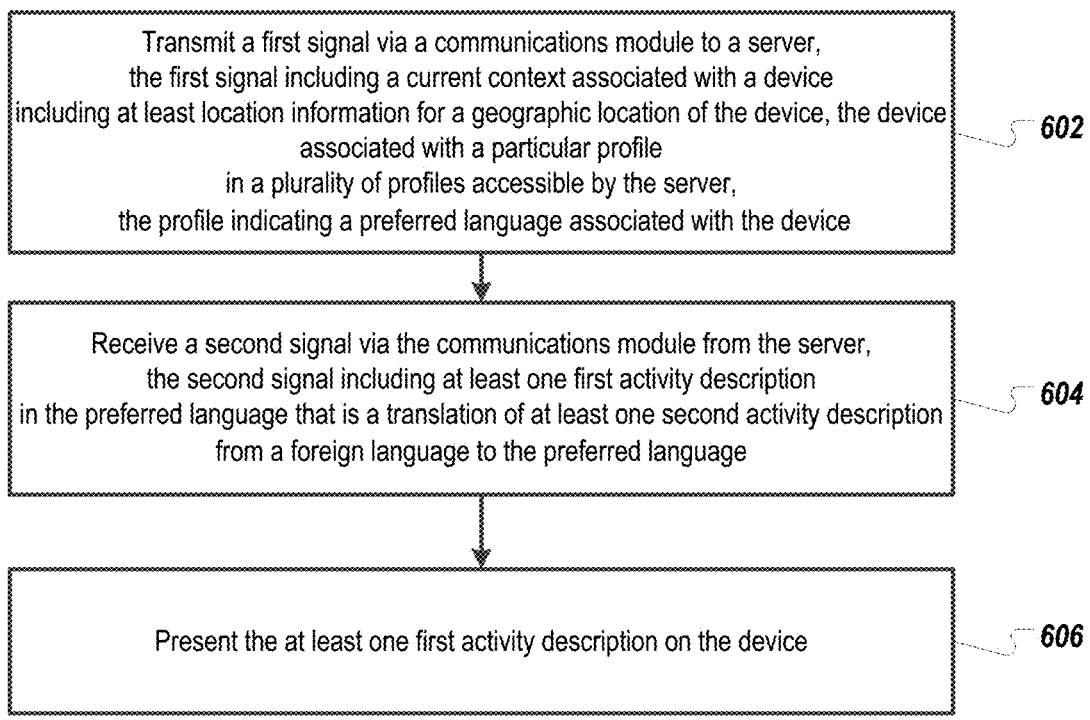
FIG. 6 is a flowchart for presenting a recommendation for a suggested activity.

FIG. 6 is a flowchart of an example method 600 for presenting a recommendation for a suggested activity. It will be understood that method 600 and related methods may be performed, for example, by any suitable system, environment, software, and hardware, or a combination of systems, environments, software, and hardware, as appropriate. For example, a client or other computing device can be used to execute method 600 and related methods and obtain any data from the memory of the client or the other computing device. In some implementations, the method 600 and related methods are executed by one or more components of the system 100 described above with respect to FIG. 1. For example, the method 500 and related methods can be executed by the client device 104 of FIG. 1.

At 602, a first signal is transmitted via a communications module to a server. The first signal includes a current context associated with a device including at least location information for a geographic location of the device. The device is associated with a particular profile in a plurality of profiles accessible by the server. The profile indicates a preferred language associated with the device.

At 604, a second signal is received via the communications module from the server. The second signal includes at least one first activity description in the preferred language that is a translation of at least one second activity description from a foreign language to the preferred language. The at least one second activity description is a search result of a search performed by the server of a repository of establishment information that includes descriptions of activities that are available to be performed at a plurality of geographic locations. The search was performed to identify at least one activity based on the location information, the current context associated with the device, and at least one determined contextual activity preference identified for the device based on the profile. The at least one identified activity matches the current context associated with the device and the at least one determined contextual preference.

At 606, the at least one first activity description is presented on the device. It should be noted that although the embodiments provided above are directed largely towards restaurant vendors, that other types of vendors, establishments, or facilities may be used, such as gyms, golf courses, etc.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 800 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A system comprising:
   a server;
   a client device; and
   at least one memory storing instructions, the memory accessible to the server, a plurality of profiles, and a repository of establishment information including descriptions of activities that are available to be performed at a plurality of geographic locations;
   wherein the server is configured to:
   receive a first transmission from the client device, the first transmission including a current context associated with the client device including at least location information for a geographic location of the client device, the client device associated with a particular profile in the plurality of profiles;
   determine, from the particular profile, a preferred language associated with the client device;
   analyze the particular profile to identify at least one contextual activity preference associated with the particular profile;
   automatically determine at least one matching contextual activity preference from among the identified at least one contextual activity preference, wherein the at least one matching contextual activity preference matches the current context associated with the client device, wherein the at least one matching contextual activity preference indicates a preference for at least one activity to be performed in the current context associated with the client device;
   in response to receiving the first transmission, search the repository of establishment information based on the location information, the current context associated with the client device, and the at least one determined contextual activity preference to automatically identify at least one activity in response to the search, the at least one identified activity matching the current context associated with the client device and the at least one matching contextual activity preference, the at least one identified activity associated with at least one activity description in a foreign language different than the preferred language associated with the client device;
   translate the at least one activity description of the at least one identified activity from the foreign language to the preferred language to create at least one translated activity description; and
   in response to creating the at least one translated activity description, transmit a second transmission to the client device, the second transmission including the at least one translated activity description for presentation at the client device; and
   wherein the client device is configured to:
   provide the first transmission to the server;
   receive the second transmission from the server; and
   present the translated activity description;
   transmit, to the server, a third transmission indicating a selection of a first suggested activity to be performed at a first establishment; and
   wherein the server is configured to:
   receive the third transmission from the client device;

automatically generate, in response to receiving the third transmission, an audio recording that audibly describes, in the foreign language, a request for the first suggested activity;

automatically place a telephone call to the first establishment; and while connected on the call, automatically play the audio recording to automatically request the first suggested activity from the first establishment.

2. The system of claim 1, wherein the server is configured to transmit a fourth transmission to the client device, the fourth transmission including direction information in the preferred language describing directions from the geographic location of the client device to the first establishment; and wherein the client device is configured to present the direction information.

3. The system of claim 2, wherein the server is configured to transmit a fifth transmission to the client device, the fifth transmission including the activity description of the first suggested activity in the foreign language; and wherein the client device is configured to present the activity description of the first suggested activity in the foreign language, for presentation to an employee of the first establishment.

4. The system of claim 1, wherein the first suggested activity is ordering an item from the first establishment; and wherein the server is configured to:

transmit a sixth transmission to the client device, the sixth transmission including at least one item description, in the preferred language, of at least one item available for ordering at the first establishment;

receive, from the client device, a seventh transmission indicating selection of a first item description;

translate the first item description from the preferred language to the foreign language to generate a translated item description; and transmit an eighth transmission to the client device, the eighth transmission including the translated item description; and wherein the client device is configured to:

receive the sixth transmission from the server;

present the at least one item description in the preferred language;

receive user input indicating selection of the first item description;

provide, to the server, the seventh transmission;

receive, from the server, the eighth transmission; and present the translated item description, for presentation to an employee of the first establishment.

5. The system of claim 1, wherein the server is configured to facilitate payment to the first establishment for the first suggested activity.

6. The system of claim 1, wherein the current context includes at least one of time of day, time of year, or day of week.

\* \* \* \* \*